United States Patent [19]

Vaidya

[11] 4,049,767

[45] Sept. 20, 1977

[54] ROTATIONAL MOLDING PROCESS FOR FORMING A CLOSED HOLLOW TOROIDAL ARTICLE

[76] Inventor: Deepak V. Vaidya, (Sailee) Plot No. 9, Baner Road, Pune, Maharashtra 411007, India

[21] Appl. No.: 626,082

[22] Filed: Oct. 28, 1975

Related U.S. Application Data

[63] Continuation-in-part of Ser. No. 512,176, Oct. 4, 1974, abandoned.

[51] Int. Cl.² .................... B29C 5/04; B29H 17/00
[52] U.S. Cl. .................... 264/257; 264/269; 264/275; 264/277; 264/303; 264/310; 264/311; 425/435
[58] Field of Search ............. 264/310, 311, 312, 303, 264/257, 269, 277; 156/110 R, 110 CL, 110 C, 118; 425/35, 242 R, 247, 425, 435

[56] References Cited

U.S. PATENT DOCUMENTS

| | | | |
|---|---|---|---|
| 2,830,325 | 4/1958 | Bray | 264/303 |
| 2,944,814 | 7/1960 | Thoeming | 264/311 |
| 3,555,141 | 1/1971 | Beneze | 264/311 |
| 3,645,655 | 2/1972 | Beneze | 264/311 |
| 3,751,551 | 8/1973 | McGillvary | 264/311 |
| T948,001 | 7/1976 | Smith | 264/311 |
| T952,006 | 11/1976 | Hanoch | 264/311 |

*Primary Examiner*—James B. Lowe
*Attorney, Agent, or Firm*—Harold S. Meyer

[57] ABSTRACT

Closed hollow toroidal articles such as hollow tires, which may be caused to be thickest at the tread, are molded on the inner surface of a closed toroidal mold slowly rotating on a horizontal axis by charging a fluid elastomer material in such quantity as to fill the bottom of the mold to a level above the wheel-supporting part of the tire and continuing rotation while causing the material to set to a solid elastomer progressively inwards from the liquid contacting surface of the mold. The relative thickness of different parts can be adjusted by changes in rotation, or by inducing different rates of setting in different parts of the mold.

13 Claims, 18 Drawing Figures

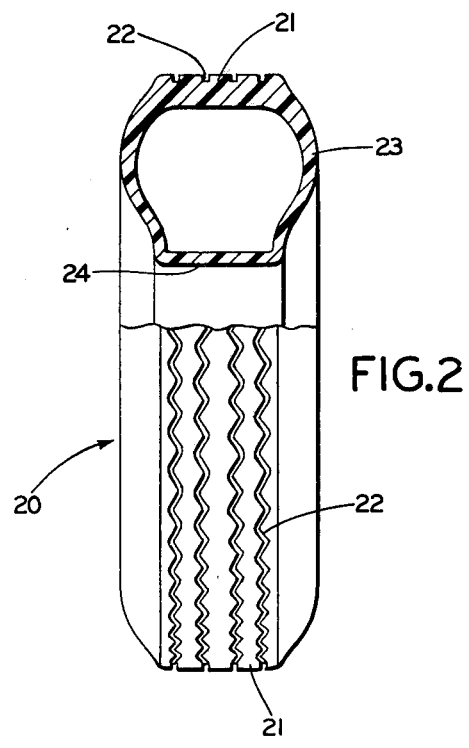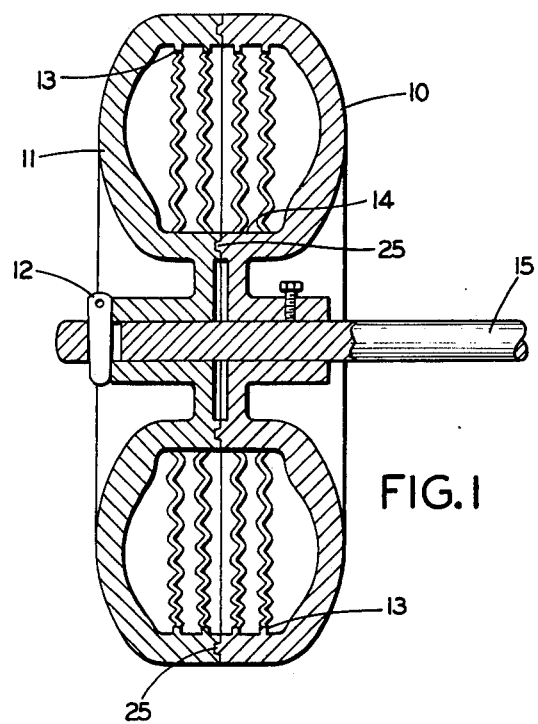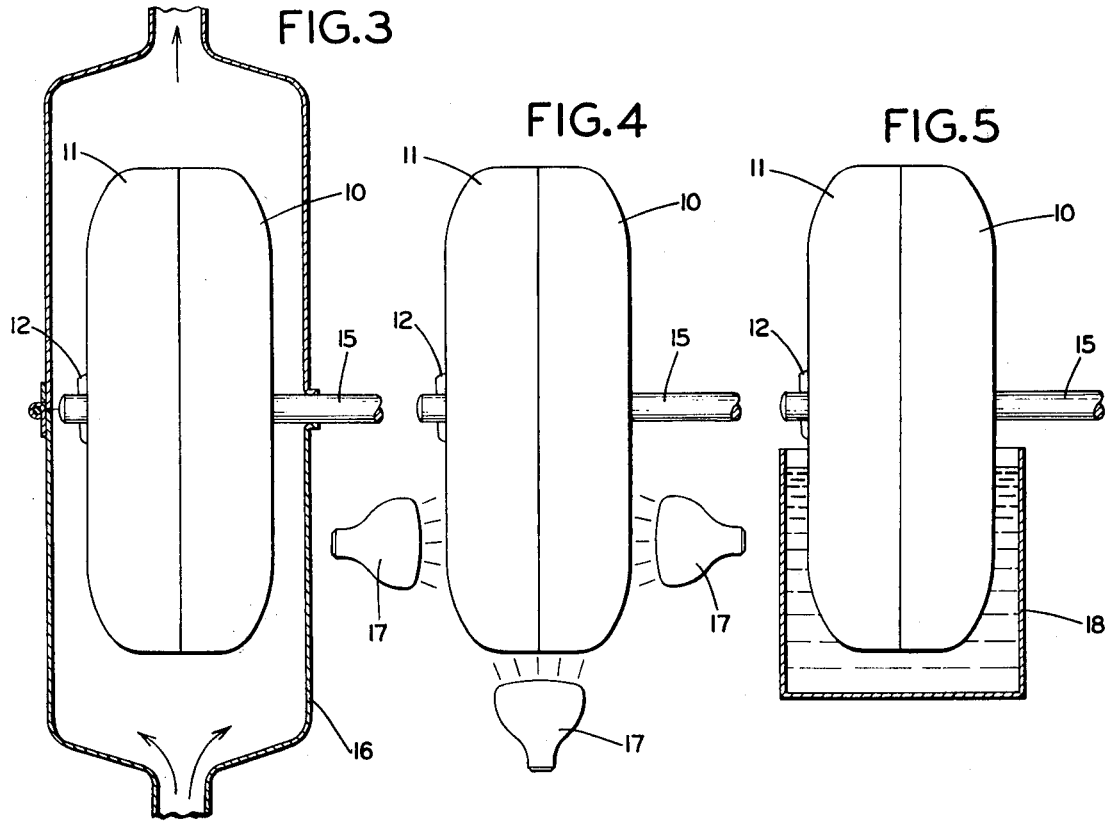

ROTATIONAL MOLDING PROCESS FOR FORMING A CLOSED HOLLOW TOROIDAL ARTICLE

CROSS-REFERENCE

This application is a continuation in part of application Ser. No. 512,176 filed Oct. 4, 1974, now abandoned.

BACKGROUND

The molding of hollow articles by solidification of a fluid material against the inner surface of a hollow mold has been practiced for a great many years with a wide variety of materials, including fused solids such as metals or wax which are solidified by chilling the molds, or heat-reactive materials such as heat-denaturable proteins or thermosetting plastics which are solidified by heating the molds, or materials which are caused to change state to a solid by successive heating and cooling such as vinyl plastisols or fluent thermoplastic powders, or even materials which are caused to change state by diffusion of a solidifying ingredient such as latex set up by diffusion of a coagulant from the surface of the mold.

With all of these materials, several manipulative procedures may be used. In slush molding, the mold is completely filled and after a sufficiently thick deposit is formed on its inner surface the excess material is poured out. In rotational casting, the exact quantity of material needed is placed in the mold which is then gyrated to distribute the material uniformly over the inner surface, which is generally accomplished by complex machines which rotate the molds about two axes. In centrifugal casting, the exact quantity of material needed is placed in a generally cylindrical mold which is spun at high speed to cause centrifugal force to distribute the material in such a way as to present a cylindrical free surface on the inside of the article.

If an irregular or non-uniform surface is needed, more or less complex auxiliary mechanisms or procedures are required in all of these previously known processes. Moreover, hollow toroidal objects cannot be produced at all in any simple embodiment of the foregoing procedures.

SUMMARY OF THE INVENTION

I have invented a process which is especially adapted for molding all-elastomer pneumatic of semi-pneumatic tires because it not only produces the desired hollow toroidal shape but also, with the very simplest equipment and procedure, automatically provides a maximum thickness at the periphery or tread portion and a minimum thickness at the wheel-supporting portion which is not ordinarily subjected to wear. With some simple additions, reinforcing elements of various kinds can be incorporated in the tires or similar hollow toroidal products.

By some other modifications or additions to the equipment or procedure the relative thickness of different parts of the hollow toroid can be adjusted to meet special requirements for different products or different types of service of the products.

The equipment needed in the simplest form of the invention is only a divided toroidal mold mounted for slow revolution on its axis, together with means for setting up or solidifying the chosen material.

A presently preferred material is a well known elastomeric polyurethane mix, that is, a polyisocyanate together with a polyol or a mixture of polyol and polyamine so chosen that they react when heated to produce a crosslinked resilient elastomer of high resistance to abrasive wear, or even a polyisocyanate with a hydroxy-terminated liquid elastomer. However, many other kinds of materials can be used, including thermoplastic elastomers such as preplasticized polyvinyl chloride powders in free flowing form or liquid vinyl plastisols. For products not required to be elastomeric, the materials can even be such as will set up to rigid solids. The only requirements are that the material be initially sufficiently fluent to gravitate to the bottom of the mold, and be capable of setting progressively in response to an influence supplied from the mold surface.

The setting of the fluent material can be induced by heat or by chilling or by diffusion of chemicals, depending on the nature of the material, as is well known.

Neither the materials nor the equipment needed are critical to this invention nor essentially novel. Tire manufacturers have known suitable materials for all-elastomer molded tires for many years, but have lacked procedures for fabricating hollow tires from such materials in a simple and economical way. It is this lack which is supplied by the present invention.

The new procedure of this invention consists in charging the mold with a quantity of fluent material which will completely fill the bottom arc of the hollow toroidal mold when its axis is horizontal so that the material is in contact with all portions of the cross-sectional periphery of the mold (the tread portion, the sidewall portions, and the radially innermost portions forming the wheel-supporting part of the tire) and then rotating the mold slowly about its horizontal axis while causing the material to set progressively inward from the mold surface.

When this procedure is followed, it is found that the initial setting or solidification of the previously fluent elastomer material occurs over the entire inner surface of the mold as each portion of the inner surface dips repeatedly under the surface of the pool of fluent material. The progressive setting removes more and more of the elastomer material from the pool and constantly increases the volume of set elastomer which is present in the part of the circumference of the tire which has momentarily lost contact with the remaining liquid pool. Consequently, the level of liquid in the pool is steadily lowered until the liquid is no longer in contact with the already deposited elastomer at the radially innermost part of the molding surface. At that moment deposition of elastomer on the inside of the wheel-supporting part of the tire ceases.

As rotation continues, the pool of elastomer material continues to deposit on the areas which still dip under the pool at each revolution, namely, tread and sidewall portions at first, but less and less of the sidewalls, until finally the deposition occurs almost entirely in the tread region of the tire. The tread therefore becomes the thickest part.

In the case of manufacture of the tire from heat-settable material such as polyurethane, or vinyl plastisol, heat, which is the influence causing the material to set, can be supplied to the mold in any number of convenient forms since only bilateral heating symmetry needs to be ensured in the manufacture of simple symmetrical tires. Circumferential symmetry necessarily results from the uniform rotation of the mold.

For example, the mold can be rotated in a narrow vertically walled air oven with its walls equidistant from the two tire sidewalls and with a hot air supply directly and symmetrically below the mold.

Radiant heating is also very simple. Three heat lamps, one focused on the tread portion of the mold and two focused symmetrically on the sidewall portions of the mold, give good results.

Another method is to arrange for the bottom part of the rotating mold to dip into a trough of heated water or other suitable liquid, which will provide quick heat transfer and uniform heat, when that is desirable. This avoids the need for the axis of rotation to be in the heated liquid, and thereby eliminates all of the structural complications which that would require.

Although the invention in its simplest form inherently produces a hollow toroid thickest at its periphery, which is generally desirable for manufacture of hollow tires, the procedure can easily be modified so as to alter the relative thickness of different parts, either by accentuating the thickness of the periphery where most of the wear of a tire occurs, or by inducing formation of zones of increased thickness at the sidewalls for better support of the treads, or even by thickening the radially innermost portion. The simplest way to accomplish such a change in relative thickness is by modifying the heat transfer ability of different parts of the mold for making a hollow toroid from heat-settable material, either by changing the thickness of different mold zones, or by making different zones of different materials.

If some setting means other than heat is preferred, for deposition of a particular kind of material or for other reasons, it too can be uniform over the molding surface, or may be concentrated in particular zones according to the uniform or variable thickness desired in the product.

THE DRAWINGS

In the accompanying drawings, FIG. 1 shows, in section, one form of mold for practice of the invention.

FIG. 2 shows, in partial section, a tire produced in the mold of FIG. 1.

FIGS. 3, 4, and 5 show, on a somewhat smaller scale, various means for heating the molds.

FIGS. 6 and 7 show, in section, the initial relation of material to the mold,

FIGS. 8 and 9 similarly show an intermediate stage, and

DETAILED DESCRIPTION

Figure 6:
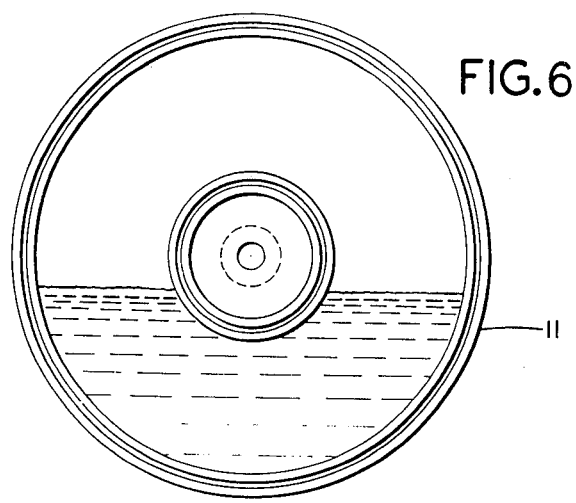

Referring first to FIG. 1, suitable equipment for practice of the invention includes a hollow toroidal split mold, which may consist of a half mold 10 mounted concentrically on a shaft 15 provided with a motor and speed reducer drive (not shown) or other means for slow rotation. The mating half mold 11 is concentrically mounted on the same shaft 15 and may be held in closed position by a wedge clamp 12 or other suitable closure.

The shaft 15 is preferably supported by conventional means (not shown) holding it in the horizontal operating position illustrated and permitting it to be in a vertical position when it is not rotating.

The inner surfaces of the two halves 10 and 11 of the mold define the complete external shape of the tire which is to be manufactured. A typical tire 20 is illustrated in FIG. 2, and has the general shape of a hollow toroid, including a thick tread 21, which may include conventional antiskid tread grooves 22, sidewalls 23, and a wheel-supporting portion 24 which engages the rim of the wheel on which it is to be used.

Correspondingly, the halves of the mold may each have internal ribs 13 to form the tread grooves, and radially inner surfaces 14 corresponding to the shape of the wheel rim. The halves are preferably provided with mating conical surfaces 25 to assure concentricity, and should fit tightly so that the liquid elastomer will not leak.

In manufacturing a tire in accordance with this invention, the mold is preferably tilted with its shaft 15 vertical and is opened. A measured charge of liquid elastomer material, such as an elastomeric polyurethane mix, is poured into the cavity of half mold 10 and the other half mold 11 is placed against it and clamped. The mold is than restored to its operating position with shaft 15 horizontal as shown in FIG. 1 and slow rotation is started, at about 10 to 30 revolutions per minute.

Heat is applied at the same time that rotation is started. Any conventional means may be used, provided it is capable of bringing to a uniform temperature the portions of the mold which are intended to produce a deposit of elastomer of uniform thickness. The mold should accordingly be free from unintended barriers to conduction of heat, as well as from unintended heat sinks.

As indicated in FIG. 3, one of the simplest and most satisfactory heating means is a hot air oven 16, provided it is arranged for symmetrical flow of the hot air so that the tires will not turn out lopsided. The oven should be split and hinged to permit tilting of the shaft 15 to a vertical position for unloading and recharging of the mold.

Another simple arrangement shown in FIG. 4 is radiant heating as by three heat lamps 17, one at each side and preferably at least one opposite the tread. They should be in sufficient number and suitable arrangement for heating the entire mold uniformly, or with such minor temperature differences as will promote production of the desired thicknesses of the various parts of the tire.

For uniform heat, a bath of liquid 18, such as water or brine (or even oil or glycerine for particularly high temperatures) may be used, as indicated in FIG. 5.

Figure 7:
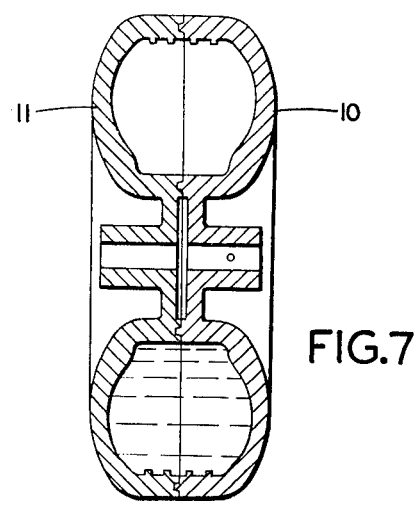

FIGS. 6 and 7 show diagrammatically the condition existing at commencement of the heating operation. Essentially all of the charge of liquid elastomer is in a pool filling a toroidal arc at the bottom of the mold.

However, rotation carries a liquid film around the entire inner surface of the mold, and the external heat quickly raises the temperature to a value causing the film to solidify or set. As the setting continues, the deposit on the inner surface of the mold increases in thickness and the volume of liquid in the pool steadily diminishes.

Figure 8:
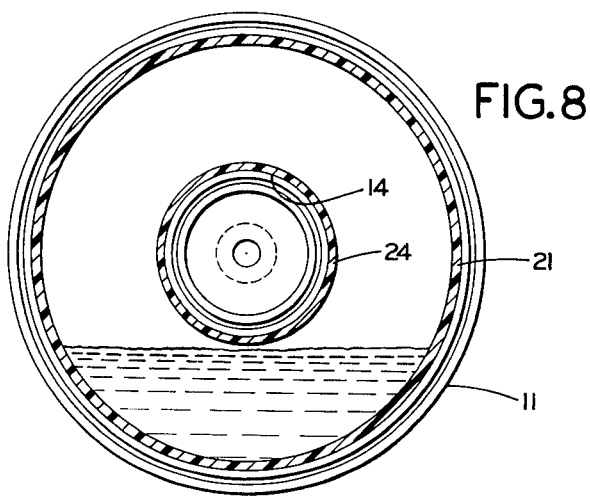
Figure 9:
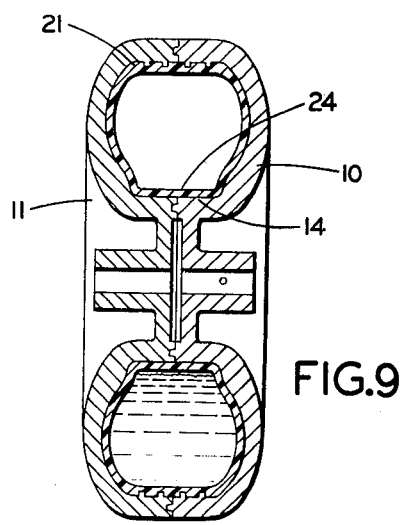

When the level of liquid in the pool drops below the wheel-supporting portion 24 of the deposited material, on radially inner molding surfaces 14, as shown in FIGS. 8 and 9, no more accretion of material at that point can occur, but deposition continues to thicken the sidewalls and tread region.

Figure 10:
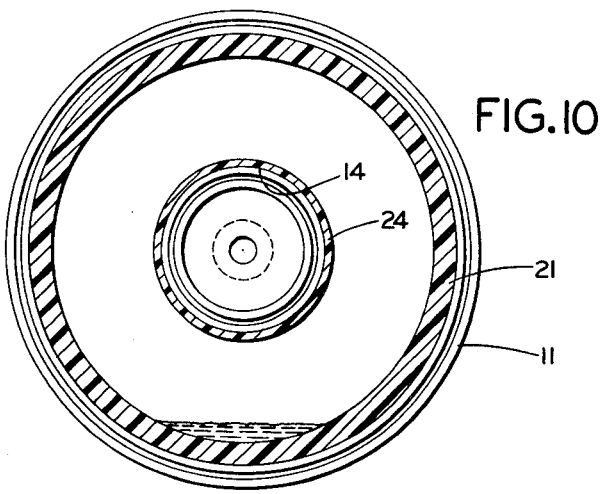
FIGS. 10 and 11 show the relationship when the procedure is nearly completed.
Figure 11:
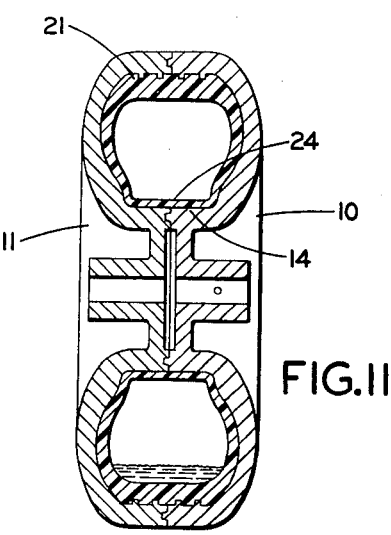

As the level of liquid in the pool drops further, as shown in FIGS. 10 and 11, deposition of elastomer material ultimately occurs essentially only in the tread region 21, which therefore ends up being the thickest part of the tire.

When the temperature and time have reached values assuring completion of setting, the mold is preferably cooled, which may be by an air blast or water spray, and the mold is opened and the finished tire is removed.

If the tire is intended for light service, as on a lawnmower, it may be operated as a semi-pneumatic tire without additional inflation. In that case the tire may be considered finished without further manufacturing operations.

If the tire is intended for heavier vehicles, for which inflation is desirable, a valve hole may be cut in a suitable location and a conventional valve (not shown) may be installed.

Alternatively, valves may be integrally attached by mounting a prefabricated valve in a suitable location in the mold so that the elastomer as it sets up will surround the base of the valve and adhere to it. Many suitable designs of valves for internal affixation in inflatable articles are known.

Many modifications of the invention are possible as has already been suggested. These may involve changes in mold design or in heat supply or in the rotation of the mold.

Thus molds may be made with walls of different thickness in different parts. As a result, thicker portions will act as heat sinks and transmit less heat or transmit heat at a lower temperature than would otherwise be the case, thus retarding the rate of deposition of solidified elastomer on the inner surface of the molds. Thinner portions, on the contrary, will transmit heat more rapidly and cause the product to be increased thickness at those portions. The same decrease or increase in thickness of deposited elastomer is obtained by using materials of different heat conductivity for different parts of the molds.

Mold structure need not be limited to equatorially split, essentially identical halves as illustrated, if suitable arrangements are made for supply of heat or other setting influences in the desired distribution. Thus the parting between mold segments may be off center if the fluent material is not conveniently handled in an exact half-mold. Moreover, the mold may be made in more than two parts, divided in any of numerous ways. It may be preferred in some instances to provide a charging port for introduction of the elastomeric material, and to close the port by a plug having an end which forms a continuous molding surface with the surrounding parts of the mold. The only absolute requirement is that the mold, when closed, will cause setting to occur over the various zones of the inner surface with the appropriate intensity to produce a finished product with the desired uniformity or variation of wall thickness.

Heat supply for setting of the charge in the mold can be varied in a great many ways. If radiant heat is used, the temperature of the radiant elements, or area of radiant surface, or location, or distance, can be adjusted, to concentrate heat for local thickening of deposits, or the reverse. If hot air is used, it can be directed in various ways by nozzles or baffles for intensification or reduction of heating in particular locations. Thus tires with particularly thick sidewalls for best support of the treads in service may be made by concentrating the beams from heat lamps on the sides of the molds.

Rotation can also be varied to alter the placement of material. The initial rotation must always be at less than centrifugal speed so that there will be a pool of material from which a deposit can be formed over the entire inner surface of the mold. However, changes in rotational speed after the initial deposit can produce a very desirable control of thickness in various ways.

As an example, a mold of the kind shown in the drawings is charged with a volume of liquid polyurethane elastomer adequate to produce a hollow uninflated or semi-pneumatic tire, and the mold is tilted to a horizontal axis position and rotated at about 10 revolutions per minute while it is heated by circulation of hot air around it. After about two thirds of the material has set enough to be non-flowable, the speed of rotation is increased to about 100 revolutions per minute, which is a centrifugal speed for the rather viscous polyurethane material. After setting is completed and the mold is opened, it is found that the product has a thicker tread and more uniform sidewalls than if the same volume of material were heated while the mold is rotated at a uniform speed of 10 revolutions per minute.

As another example, the same mold is charged with a slightly larger quantity of the same polyurethane material and is rotated at about 10 revolutions per minute while it is heated by radiation from heat lamps of greater intensity at the sidewalls than at the tread. The product is found to have sidewalls of greater thickness than with heat uniformly distributed. If, in addition, the speed of rotation is increased to about 100 revolutions per minute toward the end of the setting operation, the sidewalls will be both thicker and more uniform in thickness than with uniform heating and rotation, and the tread will be somewhat thicker than with uneven heat but uniform rotation.

Figure 17:
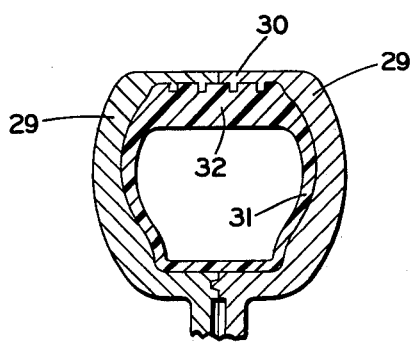
FIG. 17 shows a thin section of a mold for making a tire with an especially thick tread, and a section of a tire in the mold.
Figure 18:
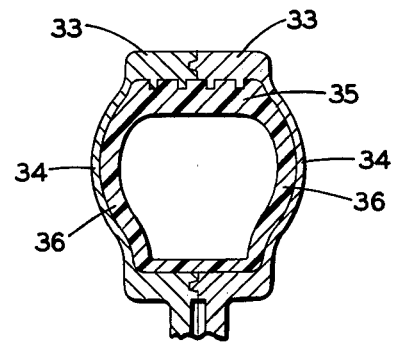
FIG. 18 shows a thin section of a mold for making a tire with especially thick sidewalls, and a section of a tire in the mold.

Moreover, a different mold 29, shown in FIG. 17, with thin walls in the tread forming location 30, when uniformly heated externally, will form a tire 31 with a particularly thick tread 32. Similarly, another mold 33, shown in FIG. 18, with thin sidewall forming portions 34, when uniformly heated externally will form a tire 35 with particularly thick sidewalls 36.

Although the tire as described is a completely closed structure, it can easily be converted to the common form having separate beads for engaging margins of the wheel rim, by circumferential slitting of the radially innermost part of the tire. If such a tire is intended for use on wide rims, it may be most economical to shape the mold in such a way that the tire beads are closely adjacent and then to separate the beads to the desired spacing after they are split apart.

Figure 12:
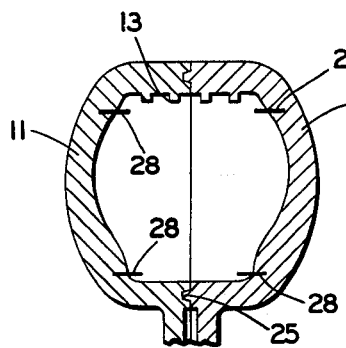
FIG. 12 shows a thin section of a mold with pins for locating reinforcements.
Figure 13:
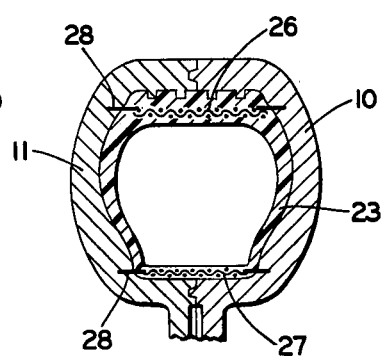
FIG. 13 shows a similar section with bands of reinforcing strands held on the pins, and elastomer deposited in the mold embedding the reinforcements.
Figure 14:
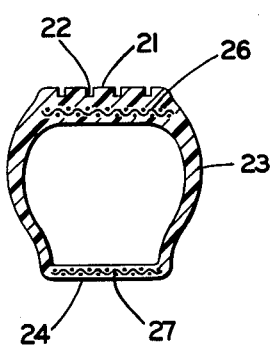
FIG. 14 is a section of the reinforced tire removed from the mold.
Figure 15:
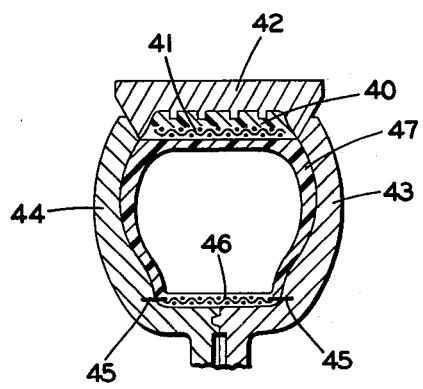
FIG. 15 shows the way in which a component such as a prefabricated tread band can be joined to a seamless hollow toroidal body, as in fabrication of a tire with a tread of compression molded material and a body of cast material bonded to it during the casting operation.

The tire as described above is an all-elastomer tire, without reinforcing cords or wires. If desired, suitable reinforcements can be embedded in the elastomer as it is solidified. For relatively heavy loads or highway speeds, for example, an inextensible flexible belt 26 made of woven strands may be embedded in the tread region as shown in FIG. 14 and inextensible grommets or a band of woven strands such as band 27 also shown in FIG. 14 may be embedded in the wheel-engaging region. For that purpose, the mold halves 10 and 11 are provided with pins 28 as shown in FIG. 12 to hold such reinforcing elements in the desired location so that the liquid elastomer will permeate the reinforcements as shown in FIG. 13 and embed them as it solidifies to form the reinforced tire of FIG. 14.

Still another variation of the invention is to embed prefabricated components. For example, best road service is generally obtained by making tire treads of compression molded solid rubber reinforced with carbon black. Accordingly, a vulcanized black rubber tread ring 40, which may contain an inextensible reinforcing belt 41 of wire strands, is positioned in a metal supporting band 42, which, together with side shells 43 and 44 defines a toroidal cavity. Pins 45 may be present to support a reinforcing band 46 for the rim-engaging portion of the tire. When charged with an elastomeric polyurethane composition capable of bonding to tread ring 40, and rotated while uniformly heated, the closed hollow toroidal tire 47 is produced, with a polyurethane body and a black rubber tread.

Other prefabricated components, such as a simple tread without reinforcements, or beads containing inextensible grommets, or a rim band with reinforcement across its entire width for seating on a flat rim, may be incorporated in a similar manner.

In these procedures involving prefabricated components, and also in some other cases, it will be useful to use a mold capable of withstanding high pressure and to inject compressed air or inert gas for consolidating the structure as it is produced.

Figure 16:
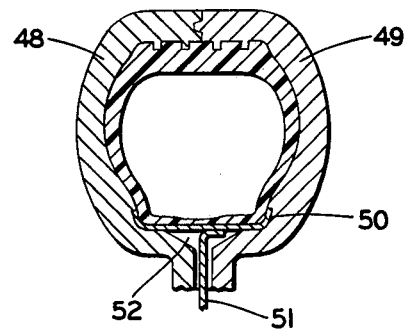
FIG. 16 shows how a wheel or rim may be placed in the mold for direct bonding of the polyurethane elastomer to the wheel rim.

Another useful modification shown in FIG. 16 involves the direct bonding of the elastomer to a wheel rim. For this purpose the mold halves 48 and 49 are recessed at the radially innermost portion to receive a rim 50 which may or may not be attached to a wheel disc 51 or other supporting member. The exposed mold surfaces are given the usual anti-adhesive coating, but the rim 50 is either carefully cleaned for direct bonding of the polyurethane elastomer or is even given a preliminary coating of an adhesion promoting composition. Because of poor heat transfer across the void 52 surrounding the wheel, the deposit of elastomer is thinnest at the central zone of the rim, where elastomeric material is not needed.

The tires produced by the process of this invention appear to be unique in structure, since no way was known before for making a completely closed seamless hollow toroidal molded article such as the tires described above. All previous manufacturing procedures have involved making the tires as open structures, or at least providing some kind of aperture through which some part of the manufacturing equipment or material had to be removed. Consequently, closed toroidal tires or other closed hollow toroids have always required closing by some kind of seaming operation. The structure in which the greatest thickness is automatically produced at the tread is particularly novel and useful.

While the invention has been specifically described with reference to production of hollow toroidal vehicle tires made from a fluent material which sets by heat to an elastomeric condition, the invention can be used to produce any kind of unitary closed seamless hollow toroidal molded article made from any fluent material which can be caused to set progressively to a solid by an influence acting from the surface of a mold.

I claim:

1. A process for molding a closed hollow toroidal article thickest at its outer periphery, which comprises charging one part of a split hollow toroidal mold with a fluent material which can be caused to set to a solid, in a quantity substantially less than that required to fill the mold cavity but sufficient to fill completely the lower arc of the mold cavity when such that the fluent material is in contact with all portions of the cross-sectional periphery of the lowermost radial section of the toroidal mold its axis is horizontal, completely closing the mold, placing the mold with its axis horizontal, slowly rotating the mold on its axis, causing the material to set progressively from the inner surface of the mold until the entire charge of material is solidified, opening the mold, and removing the article.

2. A process as in claim 1, in which the material is caused to set by external heat.

3. A process as in claim 1, in which the material is one which becomes elastomeric upon setting to a solid.

4. A process as in claim 3, in which the material is a polyurethane elastomer mix.

5. A process as in claim 3, in which the inner periphery of the mold cavity has the contour of a wheel rim and the outer periphery of the mold cavity is shaped for producing a tire tread.

6. A process as in claim 5, in which the material is a polyurethane elastomer mix.

7. A process as in claim 1, in which the speed of rotation is increased to a centrifugal speed after a predetermined portion of the charge of material is set to a non-flowable condition.

8. A process as in claim 1, in which the material is set by heat and the supply of heat to the charge of material in the mold is greater at one zone than at the other zone of the mold.

9. A process as in claim 6, in which the speed of rotation is increased to a centrifugal speed after a predetermined portion of the charge of material is set to a non-flowable condition.

10. A process as in claim 9, in which the material is caused to set by external heat.

11. A process as in claim 10, in which the supply of heat to the charge of material in the mold is greater at one zone than at another zone of the mold.

12. A process as in claim 1, in which reinforcing strands are supported in the mold in positions in which they become embedded in the charge of material.

13. A process as in claim 11, in which reinforcing strands are supported in the mold in positions in which they become embedded in the charge of material.

* * * * *

UNITED STATES PATENT AND TRADEMARK OFFICE
CERTIFICATE OF CORRECTION

PATENT NO. : 4,049,767
DATED : September 20, 1977
INVENTOR(S) : Deepak V. Vaidya It is certified that error appears in the above–identified patent and that said Letters Patent are hereby corrected as shown below:

Column 1, line 48, "of" should be --- or ---.

Column 4, line 36, "than" should be --- then ---.

Column 8, line 18 (Claim 1, seventh line) delete "when".

Column 8, line 21 (Claim 1, tenth line) before "its axis" insert --- when ---.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*